July 4, 1950
A. DUNN ET AL
2,514,278
MOWING APPARATUS
Filed Sept. 4, 1945
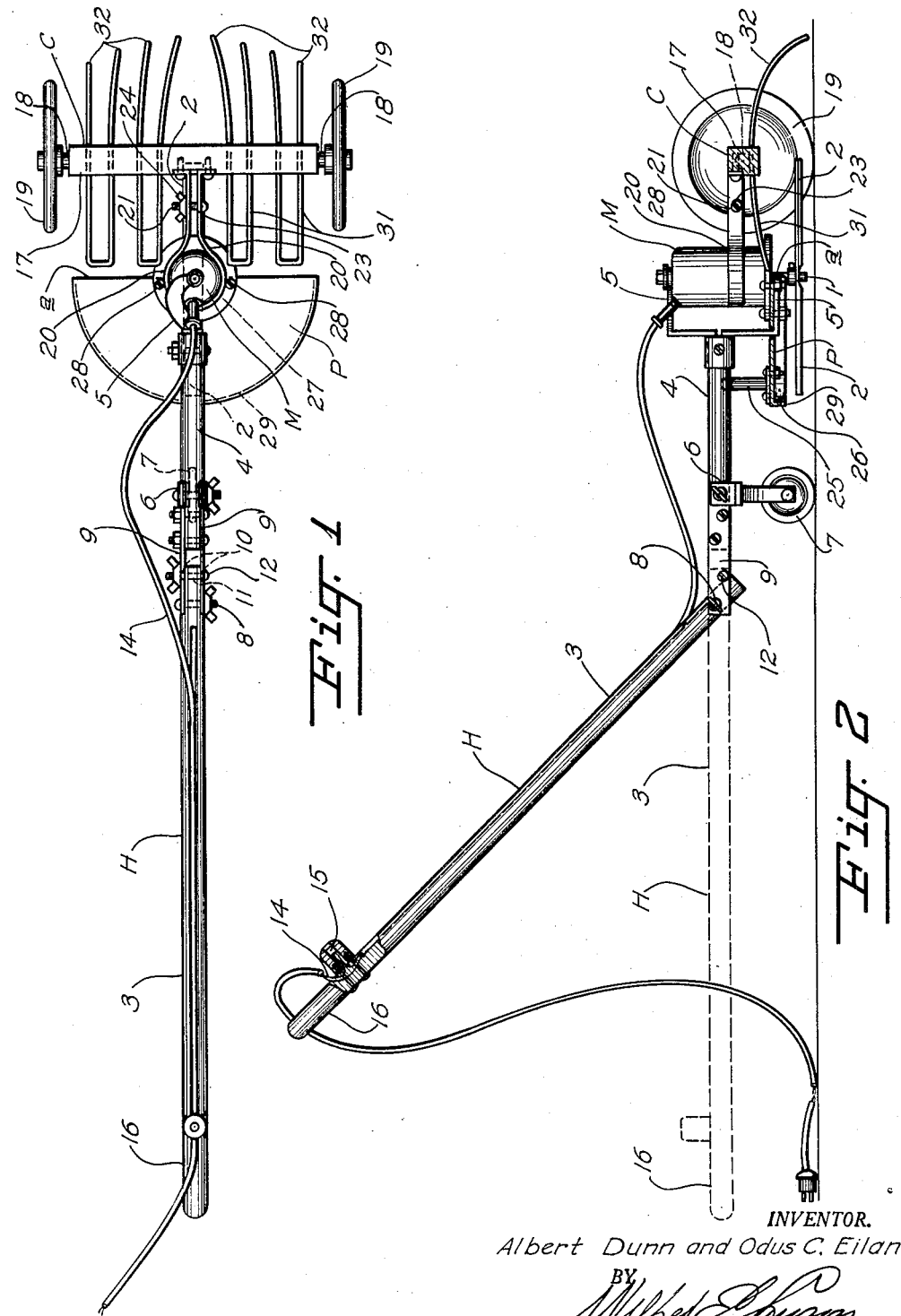
INVENTOR.
Albert Dunn and Odus C. Eiland
BY Wilfred Lawson
Attorney Patented July 4, 1950

2,514,278

UNITED STATES PATENT OFFICE 2,514,278

MOWING APPARATUS

Albert Dunn and Odus C. Eiland,
Mount Rainier, Md.

Application September 4, 1945, Serial No. 614,100

1 Claim. (Cl. 56—25.4)

This invention relates to mowing apparatus and it is a particular object of the invention to provide an apparatus of this kind which comprises a power-driven cutting element which can be conveniently used for the trimming of hedges or the like or which can be mounted upon a carriage in a manner to permit said cutting element to be effectively employed in the mowing of a lawn.

It is also an object of the invention to provide an apparatus of this kind including a wheel-supported element provided with means for releasably holding thereto a cutting element including an electric motor, together with an articulated handle member for moving the apparatus, a part of the handle member directly engaged with the motor carrying a ground-engaging part to assure the cutting element being maintained in effective working position when the apparatus is being used as a lawn mower.

A still further object of the invention is to provide a cutting equipment including a carriage and a separable cutting element adapted to be removably engaged with the carriage and wherein an operating handle is connected directly with the cutting element, said handle member facilitating the use of the equipment when in assembly for mowing a lawn or for independently employing the cutting element for trimming hedges or kindred work, said handle member being articulated to allow desired relative adjustments of the parts of the handle member, together with means for rigidly holding such parts of the handle member in their selected relative adjustment.

Furthermore, it is an object of the invention to provide an equipment of this kind comprising a cutting element including an electric motor and a handle member operatively engaged with said motor, said handle member being provided at a desired point therealong with a laterally directed hand grasp and wherein suitable conductors for connection with a source of electrical energy lead from the motor and extend along the handle member, the hand grasp carrying a switch for operation by the digit of a hand engaged with the hand grasp for opening or closing the circuit for the motor as desired.

The invention consists in the details of construction and in the combination and arrangement of the several parts of our improved mowing apparatus whereby certain important advantages are attained, as will be hereinafter more fully set forth.

In order that our invention may be better understood, we will now proceed to describe the same with reference to the accompanying drawings, wherein:

Figure 1 is a view in top plan of a mowing apparatus constructed in accordance with an embodiment of the invention; and Figure 2 is a view partly in side elevation and partly in section of the device as illustrated in Figure 1, a second position of the handle member being indicated by broken lines.

In the embodiment of the invention as illustrated in the accompanying drawings, M denotes a relatively light electric motor and which includes the power shaft 1. This shaft 1, as herein embodied, carries a straight and substantially flat cutting blade 2 extending to substantially equal distances at opposite sides of the shaft 1 and which blade 2 is of such length as may be preferred. In the present instance only a single blade 2 is disclosed, but it is to be understood that the invention is not limited in this respect since a plurality of blades may be used if desired.

H denotes a handle member of desired length and which, in the present embodiment, is articulated and consists of two sections 3 and 4. The section 4 of the handle member H is relatively short and has one end portion rigidly held directly to the motor M by a holding bracket 5 carried by the motor M. It is believed to be obvious, however, that this forward section 4 of the handle member H may be otherwise rigidly held with the motor M.

This section 4 of the handle member H is disposed substantially at right angles to the axis of the shaft 1 of the motor M and the outer end portion of the section 4 has detachably engaged therewith, as at 6, a caster wheel 7 which, when applied, underlies the section 4 for a purpose to be hereinafter more particularly referred to.

The second section 3 of the handle member H is of such length as will best meet with the requirements of practice and adjacent end portions of the sections 3 and 4 are pivotally connected one to the other, as at 8.

The pivoted end portion of the section 3 at opposite sides thereof carries the extended plates 9 which are adapted to overlie the side faces of the section 4 of the handle member H and the extended portions of these plates 9 are provided with the openings 10 adapted to be brought into register with an opening 11 in the outer portion of the section 4.

A holding bolt 12 is insertible through the registering openings 10 and 11 to lock the sections 3 and 4 in longitudinal alignment, such as would be best preferred when the equipment is being used as a trimmer. When the equipment is being used as a lawn mower, the holding bolt 12 is free of the plates 9 so that the section 4 of the handle member H is free to swing on the pivot 8, whereby is materially facilitated the operating of the equipment as a lawn mower.

In proper electrical connection with the motor M are the conductors 14 of such length as may be preferred and adapted, of course, for connection with a suitable source of electrical energy. These conductors 14 extend along the handle member H and one of said conductors 14 has interposed therein a switch 15, herein disclosed as positioned at the outer end of the hand grasp 16 rigid with the section 4 at a desired point thereon. By this location of the switch, the circuit for the motor M may be conveniently opened and closed under the action of a digit of the hand engaged with the hand grasp 16.

As the particular character of the switch 15 in itself forms no essential part of the present invention, it is not believed necessary that a detailed description and illustration thereof be given.

With the sections 3 and 4 of the handle member H in alignment, the blade 2 can be conveniently and effectively employed for the trimming of hedges or the like and during which time the caster wheel 7 is preferably removed.

When it is desired to use the blade 2 for the mowing of grass, the motor M is operatively mounted upon a carriage C. This carriage C, as herein disclosed, comprises an elongated and relatively heavy bar member 17 provided at its opposite ends with the outstanding axles 18 on which are mounted the ground-engaging wheels 19 which may be of any type preferred.

The bar member 17 at its longitudinal center is provided with the forwardly directed clamping jaws 20 possessing a certain degree of inherent resiliency and between which is adapted to be clamped and held the motor M with the shaft 1 downwardly disposed and substantially at right angles to the longitudinal axis of the bar member 17.

The caster wheel 7 hereinbefore referred to, when applied, is of such dimensions as to coact with the wheels 19 to maintain the section 3 of the handle member H substantially horizontal when the equipment is in assembly for use as a lawn mower and it will also be noted that, in practice, the push imposed upon the section 3 of the handle member H will be received directly upon the caster wheel 7, thus relieving the bar member 17 and the motor M in a manner to assure effective cutting action of the blade 2 when the shaft 1 is in rotation. The shaft 1 is of a length to provide for the desired spacing of the blade 2 above the contacting points of the wheels 19 when the equipment is employed as a lawn mower and as determined by the desired height of cut.

In the present embodiment of the invention, the clamping jaw members 20 have freely disposed therethrough an elongated headed shank 21, the head 23 of which contacts from without with one of the clamping jaws 20. Threading upon the shank 21 for contact from without with the second jaw 20 is a wing nut 24 whereby the effective application or convenient removal of the motor M may be readily accomplished.

The section 4 of the handle member H at a desired distance inwardly from its connection with the bracket 5 has rigid therewith and depending therefrom a relatively short post 25 to which is rigidly secured, as at 26, from below the rear central portion of a flat guard plate P. This plate P is herein disclosed as semicircular in form with its straight edge a forwardly directed and the central marginal straight edge portion is recessed, as at 27, to partially surround the lower portion of the motor M and to which said surrounding portion of the plate P is tightly clamped, as indicated at 28.

The radius of the curved portion of the plate P is determined by the length of the cutting blade 2 which travels in a path closely underlying the plate P. The rear curved margin of the plate P is defined by a depending flange 29 to provide a further guard efficiency to minimize the indiscriminate scattering of the cut material when the equipment is being used either as a lawn mower or hedge trimmer. It is to be emphasized, however, that the plate P particularly serves as a guard to prevent a person being hit by the blade 2 when the equipment is in use.

The bar member 17 has disposed therethrough at points spaced therealong the guard tines 31. These tines are of a length to extend rearwardly of the bar member 17 to closely adjacent the straight edge a of the plate P and to extend a material distance forwardly of the bar member 17 and having their forward extremities disposed downwardly to provide fingers 32 which terminate below the plane in which the knife 2 travels. These fingers 32 serve to provide effective means for separating and raising or otherwise acting upon growing grass to facilitate its cutting and also serve to effectively protect the revolving blade 2 against contact with any obstructions which may be on the ground in the path of the mower. The fingers 32 also serve as guards or bumpers to contact the trunks of trees or other growing plants to prevent the rotating blade 2 coming into contact therewith.

While in the present invention the blade 2 is shown as straight from end to end, it is believed to be obvious that such other types of knives or cutting elements may be employed as may be preferred without departing from the invention as herein embodied.

We claim

In a mowing machine, a relatively heavy axle bar having stub axles formed at its opposite ends, traction wheels on said stub axles, a motor disposed rearwardly of said axle bar, a bracket extending rearwardly from the center of said axle bar and clamped about said motor, an elongated member bracketed to said motor and extending rearwardly therefrom, a caster mounted on said member toward its rear end and supporting the same and the first bracket substantially level with the ground, said motor having its rotor shaft vertically disposed, a cutting blade keyed on the lower end of said rotor shaft, a post depending from said member forwardly of said caster, a guard plate supported on the lower end of said post and extending forwardly therefrom immediately above the path of movement of said cutting blade, a plurality of arcuate tines extending through said axle bar and having the forward ends of the same disposed in close proximity to the ground, and a handle pivoted to the rear end of said member.

ALBERT DUNN.
ODUS C. EILAND.

REFERENCES CITED

The following references are of record in the file of this patent:

UNITED STATES PATENTS

| Number | Name | Date |
|---|---|---|
| Re. 21,274 | Orr | Nov. 21, 1939 |
| 784,396 | Hall | Mar. 7, 1905 |
| 1,871,606 | Haddad | Aug. 16, 1932 |
| 1,876,504 | Rossiter et al. | Sept. 6, 1932 |
| 2,091,827 | Mercatoris | Aug. 31, 1937 |
| 2,329,372 | Hitch | Sept. 4, 1943 |